United States Patent
Morimitsu et al.

(10) Patent No.: US 8,840,232 B2
(45) Date of Patent: *Sep. 23, 2014

(54) PHASE CHANGE INK

(75) Inventors: Kentaro Morimitsu, Mississauga (CA);
Jennifer L. Belelie, Oakville (CA);
Naveen Chopra, Oakville (CA);
Stephan V. Drappel, Toronto (CA);
Corey L. Tracy, Mississauga (CA);
Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 703 days.

This patent is subject to a terminal disclaimer.

(21) Appl. No.: 13/095,028

(22) Filed: Apr. 27, 2011

(65) Prior Publication Data

US 2012/0274698 A1    Nov. 1, 2012

(51) Int. Cl.
*B41J 2/01* (2006.01)
*C09D 11/38* (2014.01)
*C09D 11/34* (2014.01)

(52) U.S. Cl.
CPC ............... *C09D 11/38* (2013.01); *C09D 11/34* (2013.01)
USPC ...................................................... 347/100

(58) Field of Classification Search
CPC ....... C09D 11/34; C09D 11/38; B42J 2/1631; B42J 2/1642
USPC ...................................................... 347/100
See application file for complete search history.

(56) References Cited

U.S. PATENT DOCUMENTS

| | | | |
|---|---|---|---|
| 4,251,824 A | 2/1981 | Hara et al. | |
| 4,410,899 A | 10/1983 | Haruta et al. | |
| 4,412,224 A | 10/1983 | Sugitani | |
| 4,490,731 A | 12/1984 | Vaught | |
| 4,532,530 A | 7/1985 | Hawkins | |
| 4,601,777 A | 7/1986 | Hawkins et al. | |
| 5,134,189 A * | 7/1992 | Matsushita et al. | 524/549 |
| 5,195,430 A | 3/1993 | Rise | |
| 5,231,135 A | 7/1993 | Machell et al. | |
| 5,372,852 A | 12/1994 | Titterington et al. | |

(Continued)

FOREIGN PATENT DOCUMENTS

EP    0 941 855 B1    7/2005
JP    2007328062 A  * 12/2007 ............... G02B 5/20

OTHER PUBLICATIONS

Canadian Patent Office Communication dated May 17, 2013, for Canadian Patent Application No. 2,775,198, 2 pages.

(Continued)

*Primary Examiner* — Laura Martin
(74) *Attorney, Agent, or Firm* — Marylou J. Lavoie

(57) ABSTRACT

A phase change ink including at least one crystalline component of the formula

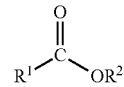

wherein $R^1$ and $R^2$ can be the same or different, and wherein $R^1$ and $R^2$ each, independently of the other, is (i) an alkyl group, (ii) an arylalkyl group, (iii) an alkylaryl group, or (iv) an aromatic group, provided that at least one of $R^1$ and $R^2$ is an aromatic group, and wherein the crystalline component has a melting point of from about 65° C. to about 150° C.; at least one amorphous component; and an optional colorant.

10 Claims, 3 Drawing Sheets

(56) References Cited

U.S. PATENT DOCUMENTS

| | | | |
|---|---|---|---|
| 5,389,958 | A | 2/1995 | Bui et al. |
| 5,621,022 | A | 4/1997 | Jaeger et al. |
| 5,698,017 | A | 12/1997 | Sacripante et al. |
| 5,817,169 | A | 10/1998 | Sacripante et al. |
| 6,221,137 | B1 | 4/2001 | King et al. |
| 6,472,523 | B1 | 10/2002 | Banning et al. |
| 6,476,219 | B1 | 11/2002 | Duff et al. |
| 6,547,380 | B2 | 4/2003 | Smith et al. |
| 6,576,747 | B1 | 6/2003 | Carlini et al. |
| 6,576,748 | B1 | 6/2003 | Carlini et al. |
| 6,590,082 | B1 | 7/2003 | Banning et al. |
| 6,646,111 | B1 | 11/2003 | Carlini et al. |
| 6,663,703 | B1 | 12/2003 | Wu et al. |
| 6,673,139 | B1 | 1/2004 | Wu et al. |
| 6,682,587 | B2 | 1/2004 | Hendricks et al. |
| 6,696,552 | B2 | 2/2004 | Mayo et al. |
| 6,713,614 | B2 | 3/2004 | Carlini et al. |
| 6,726,755 | B2 | 4/2004 | Titterington et al. |
| 6,755,902 | B2 | 6/2004 | Banning et al. |
| 6,821,327 | B2 | 11/2004 | Jaeger et al. |
| 6,958,406 | B2 | 10/2005 | Banning et al. |
| 7,053,227 | B2 | 5/2006 | Jaeger et al. |
| 7,084,190 | B2 | 8/2006 | Everhardus et al. |
| 7,271,284 | B2 | 9/2007 | Toma et al. |
| 7,381,831 | B1 | 6/2008 | Banning et al. |
| 7,427,323 | B1 | 9/2008 | Birau et al. |
| 2006/0038871 | A1 | 2/2006 | Chen et al. |
| 2011/0059233 | A1 | 3/2011 | Liu et al. |

OTHER PUBLICATIONS

Rina Carlini, et al., U.S. Appl. No. 13/095,174, filed Apr. 27, 2011, "Ink Compositions Incorporating Substituted Oxazoline Compounds or Substituted Oxazoline Derivaties," not yet published, 81 pages.

Rina Carlini, et al., U.S. Appl. No. 13/095,221, filed Apr. 27, 2011, "Substituted Oxazoline Compounds or Substituted Oxazoline Derivaties," not yet published, 88 pages.

Kentaro Morimitsu, et al., U.S. Appl. No. 13/095,795, filed Apr. 27, 2011, "Solid Ink Compositions Comprising Amorphous Esters of Citric Acid," not yet published, 28 pages.

Peter G. Odell, et al., U.S. Appl. No. 13/095,043, filed Apr. 27, 2011, "Solventless Reaction Process," not yet published, 67 pages.

Naveen Chopra, et al., U.S. Appl. No. 13/095,555, filed Apr. 27, 2011, "Phase Change Inks and Methods of Making the Same," not yet published, 37 pages.

Jennifer L. Belelie, et al., U.S. Appl. No. 13/095,591, filed Apr. 27, 2011, "Phase Change Ink Components and Methods of Making the Same," not yet published, 31 pages.

Kentaro Morimitsu, et al., U.S. Appl. No. 13/095,784, filed Apr. 27, 2011, "Solid Ink Compositions Comprising Amorphous Esters of Tartaric Acid," not yet published, 31 pages.

Kentaro Morimitsu, et al., U.S. Appl. No. 13/095,715, filed Apr. 27, 2011, "Solid Ink Compositions Comprising Crystalline Esters of Tartaric Acid," not yet published, 29 pages.

Kentaro Morimitsu, et al., U.S. Appl. No. 13/095,770, filed Apr. 27, 2011, "Phase Change Inks and Methods of Making the Same," not yet published, 34 pages.

Jennifer L. Belelie, et al., U.S. Appl. No. 13/095,681, filed Apr. 27, 2011, "Solid Ink Compositions Comprising Crystalline-Amorphous Mixtures," not yet published, 31 pages.

Jennifer L. Belelie, et al., U.S. Appl. No. 13/095,636, filed Apr. 27, 2011, "Solid Ink Compositions Comprising Crystalline-Amorphous Mixtures," not yet published, 24 pages.

Paul McConville, et al., U.S. Appl. No. 13/095,038, filed Apr. 27, 2011, "Print Process for Phase Separation Ink," not yet published, 46 pages.

Thomas Edward Enright, et al., U.S. Appl. No. 13/095,015, filed Apr. 27, 2011, "Solventless Reaction Process," not yet published, 34 pages.

Marcel Slot, "Oce Printhead and CrystalPoint™ Technology,", 16th Annual European Inkjet Conference, Nov. 13, 2008, 49 pages.

* cited by examiner

PHASE CHANGE INK

RELATED APPLICATIONS

Commonly assigned U.S. patent application Ser. No. 13/095,174, entitled "Next-Generation Solid Inks From Novel Oxazoline Components, Developed for Robust Direct-to-Paper Printing", filed concurrently herewith, is hereby incorporated by reference herein in its entirety.

Commonly assigned U.S. patent application Ser. No. 13/095,221, entitled "Oxazoline Derivatives: Novel Components for a Next-Generation Robust Solid Ink", filed concurrently herewith, is hereby incorporated by reference herein in its entirety.

Commonly assigned U.S. patent application Ser. No. 13/095,795, entitled "Solid Ink Compositions Comprising Amorphous Esters of Citric Acid", filed concurrently herewith, is hereby incorporated by reference herein in its entirety.

Commonly assigned U.S. patent application Ser. No. 13/095,038, entitled "Print Process For Phase Separation Ink", filed concurrently herewith, is hereby incorporated by reference herein in its entirety.

Commonly assigned U.S. patent application Ser. No. 13/095,555, entitled "Phase Change Inks and Methods of Making the Same", filed concurrently herewith, is hereby incorporated by reference herein in its entirety.

Commonly assigned U.S. patent application Ser. No. 13/095,591, entitled "Phase Change Ink Components and Methods of Making the Same", filed concurrently herewith, is hereby incorporated by reference herein in its entirety.

Commonly assigned U.S. patent application Ser. No. 13/095,784, entitled "Solid Ink Compositions Comprising Amorphous Esters of Tartaric Acid"), filed concurrently herewith, is hereby incorporated by reference herein in its entirety.

Commonly assigned U.S. patent application Ser. No. 13/095,715, entitled "Solid Ink Compositions Comprising Crystalline Esters of Tartaric Acid"), filed concurrently herewith, is hereby incorporated by reference herein in its entirety.

Commonly assigned U.S. patent application Ser. No. 13/095,770, entitled "Phase Change Inks and Methods of Making the Same", filed concurrently herewith, is hereby incorporated by reference herein in its entirety.

Commonly assigned U.S. patent application Ser. No. 13/095,681, entitled "Solid Ink Compositions Comprising Crystalline-Amorphous Mixtures", filed concurrently herewith, is hereby incorporated by reference herein in its entirety.

Commonly assigned U.S. patent application Ser. No. 13/095,636, entitled "Solid Ink Compositions Comprising Crystalline-Amorphous Mixtures", filed concurrently herewith, is hereby incorporated by reference herein in its entirety.

Commonly assigned U.S. patent application Ser. No. 13/095,015, entitled "Solventless Reaction Process", filed concurrently herewith, is hereby incorporated by reference herein in its entirety.

BACKGROUND

Disclosed herein is a phase change ink including at least one crystalline component, wherein the crystalline component has a melting point of from about 65° C. to about 150° C.; at least one amorphous component; and an optional colorant.

Ink jetting devices are known in the art, and thus extensive description of such devices is not required herein. As described in U.S. Pat. No. 6,547,380, which is hereby incorporated by reference herein in its entirety, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing wherein an acoustic beam exerts a radiation pressure against objects upon which it impinges. Thus, when an acoustic beam impinges on a free surface such as at the liquid/air interface of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device utilizing phase change or solid inks printing directly on a substrate or on an intermediate transfer member, such as the one described in U.S. Pat. No. 5,372,852, which is hereby incorporated by reference herein in its entirety, the image is applied by jetting appropriately colored inks during four to eighteen rotations (incremental movements) of a substrate (an image receiving member or intermediate transfer member) with respect to the ink jetting head, i.e., there is a small translation of the print head with respect to the substrate in between each rotation. This approach simplifies the print head design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Thermal ink jet processes are well known and are described, for example, in U.S. Pat. Nos. 4,601,777, 4,251, 824, 4,410,899, 4,412,224 and 4,532,530, the disclosures of each of which are hereby totally incorporated herein.

As noted, ink jet printing processes may employ inks that are solid at room temperature and liquid at elevated temperatures. Such inks may be referred to as hot melt inks or phase change inks. For example, U.S. Pat. No. 4,490,731, which is hereby incorporated by reference herein in its entirety, discloses an apparatus for dispensing solid ink for printing on a substrate such as paper. In thermal ink jet printing processes employing hot melt inks, the solid ink is melted by the heater in the printing apparatus and utilized (i.e., jetted) as a liquid in a manner similar to that of conventional thermal ink jet printing. Upon contact with the printing substrate, the molten ink solidifies rapidly, enabling the colorant to substantially remain on the surface of the substrate instead of being carried into the substrate (for example, paper) by capillary action, thereby enabling higher print density than is generally obtained with liquid inks. Advantages of a phase change ink in ink jet printing thus include elimination of potential spillage of the ink during handling, a wide range of print density and quality, minimal paper cockle or distortion, and enablement of indefinite periods of nonprinting without the danger of nozzle clogging, even without capping the nozzles.

Solid inks for piezoelectric ink jet printing have been designed to successfully print in a transfix mode wherein the ink is jetted onto an intermediate transfer drum. In the transfix printing process, the ink cools from the jetting temperature (broadly, from about 75° C. to no higher than about 180° C., and typically from about 110° C. to about 140° C.) to the drum temperature (typically from about 50° C. to about 60° C.), and, subsequently, as a substantially solid phase, the ink is pressed into a paper substrate. Such a process provides a number of advantages including vivid images, economy of jet use, and substrate latitude among porous papers. However, such ink designs can present problems when applied to coated papers. In general, the ink and the print process can fail to provide sufficient image durability.

Currently available phase change or solid ink printing processes are suitable for their intended purposes. However, a need remains for a solid ink and processes for using same providing improved properties including improved adherence of image to paper, improved image permanence, and improved robustness against mechanical stresses.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a phase change ink comprising at least one crystalline component of the formula

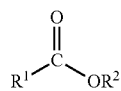

wherein $R^1$ and $R^2$ can be the same or different, and wherein $R^1$ and $R^2$ each, independently of the other, is (i) an alkyl group, which can be a linear or branched, cyclic or acyclic, substituted or unsubstituted, saturated or unsaturated alkyl group, and wherein heteroatoms may optionally be present in the alkyl group, (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, (iii) an alkylaryl group, which can be a substituted or unsubstituted alkylaryl group, wherein the alkyl portion of the alkylaryl group can be linear or branched, cyclic or acyclic, substituted or unsubstituted, saturated or unsaturated, and wherein heteroatoms may optionally be present in either the aryl or the alkyl portion of the alkylaryl group, or (iv) an aromatic group, which can be a substituted or unsubstituted aromatic group, and wherein heteroatoms may optionally be present in the aromatic group, provided that at least one of $R^1$ and $R^2$ is an aromatic group, and wherein the at least one crystalline component has a melting point of from about 65° C. to about 150° C.; at least one amorphous component; and an optional colorant.

Also described is a process comprising disposing at least one phase change ink in an imagewise fashion onto a final image receiving substrate to form an ink image, wherein disposing is at a first temperature at which the at least one phase change ink is in a molten, unseparated state; wherein the at least one phase change ink comprises at least one crystalline component of the formula

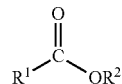

wherein $R^1$ and $R^2$ can be the same or different, and wherein $R^1$ and $R^2$ each, independently of the other, is (i) an alkyl group, which can be a linear or branched, cyclic or acyclic, substituted or unsubstituted, saturated or unsaturated alkyl group, and wherein heteroatoms may optionally be present in the alkyl group, (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, (iii) an alkylaryl group, which can be a substituted or unsubstituted alkylaryl group, wherein the alkyl portion of the alkylaryl group can be linear or branched, cyclic or acyclic, substituted or unsubstituted, saturated or unsaturated, and wherein heteroatoms may optionally be present in either the aryl or the alkyl portion of the alkylaryl group, or (iv) an aromatic group, which can be a substituted or unsubstituted aromatic group, and wherein heteroatoms may optionally be present in the aromatic group, provided that at least one of $R^1$ and $R^2$ is an aromatic group, and wherein the at least one crystalline component has a melting point of from about 65° C. to about 150° C.; at least one amorphous component; and an optional colorant; cooling the ink image to a second temperature sufficient to initiate crystallization of at the least one crystalline component; optionally, applying pressure to the ink image on the final image receiving substrate; and allowing the ink to complete crystallization.

Also described is a process which comprises (1) incorporating into an ink jet printing apparatus at least one phase change ink; wherein the at least one phase change ink comprises at least one crystalline component of the formula

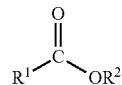

wherein $R^1$ and $R^2$ can be the same or different, and wherein $R^1$ and $R^2$ each, independently of the other, is (i) an alkyl group, which can be a linear or branched, cyclic or acyclic, substituted or unsubstituted, saturated or unsaturated alkyl group, and wherein heteroatoms may optionally be present in the alkyl group, (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, (iii) an alkylaryl group, which can be a substituted or unsubstituted alkylaryl group, wherein the alkyl portion of the alkylaryl group can be linear or branched, cyclic or acyclic, substituted or unsubstituted, saturated or unsaturated, and wherein heteroatoms may optionally be present in either the aryl or the alkyl portion of the alkylaryl group, or (iv) an aromatic group, which can be a substituted or unsubstituted aromatic group, and wherein heteroatoms may optionally be present in the aromatic group, provided that at least one of $R^1$ and $R^2$ is an aromatic group, and wherein the at least one crystalline component has a melting point of from about 65° C. to about 150° C.; at least one amorphous component; and an optional colorant; (2) heating the at least one phase change ink to a first temperature at which the at least one phase change ink is in a molten, unseparated state; (3) causing droplets of the at least one phase change ink to be ejected in an imagewise pattern onto an image receiving substrate; (4) cooling the ink image to a second temperature sufficient to initiate crystallization of the at least one crystalline component, wherein the at least one phase change ink comprises a crystalline phase and an amorphous phase; (5) optionally, applying pressure to the ink image on the image receiving substrate; and (6) allowing the ink to complete crystallization.

DETAILED DESCRIPTION

Figure 1:
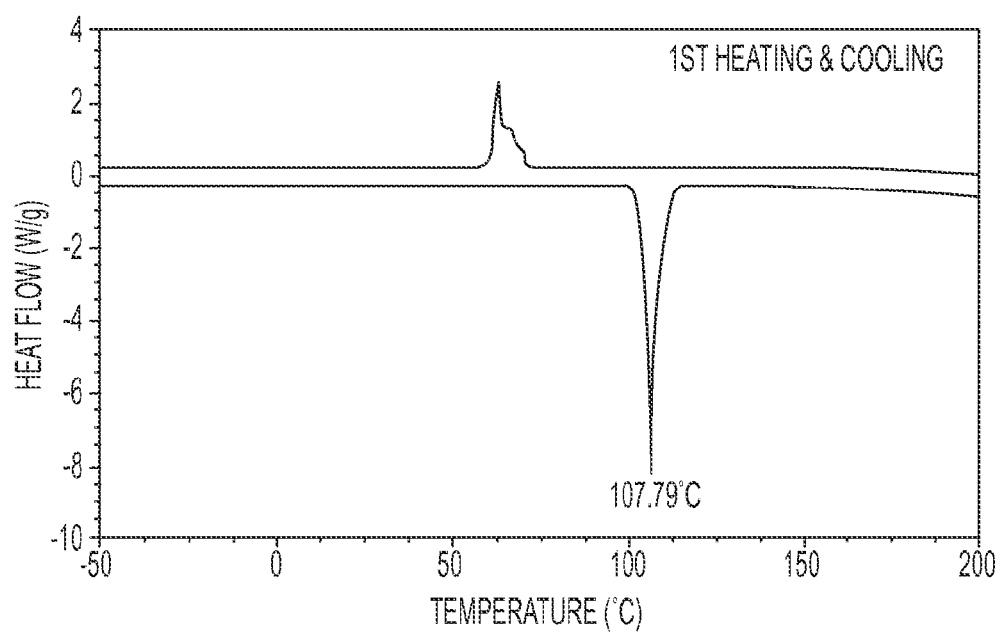
FIG. 1 is a graph illustrating heat flow (W/g, y-axis) versus temperature (° C., x-axis) for a first heating and cooling of 2-naphthyl benzoate.

In embodiments, the phase change ink described herein comprises an ink that is in a molten, unseparated state, that is, a melted, liquid, single phase, at a first temperature corresponding to a disposing or jetting temperature, and that is in a multiple phase state at a second temperature, wherein the second temperature is sufficient to initiate crystallization of at least one component of the phase change ink, and wherein at the second temperature the phase change ink comprises a crystalline phase and an amorphous phase. That is, the phase change ink can comprise at least one crystalline component that crystallizes at a second temperature and at least one amorphous component that is in an amorphous state at the second temperature. As used herein, a crystalline component or crystallizable component means a solid material, whose constituent atoms, molecules, or ions are arranged in an orderly repeating pattern extending in all three spatial dimensions. As used herein, amorphous component means a solid material which does not exhibit crystalline structure. That is, while there may be local ordering of the atoms or molecules, there is no long-term ordering thereof.

In further embodiments, a print process for the phase change ink is described comprising disposing at least one phase change ink in an imagewise fashion onto a final image receiving substrate to form an ink image, wherein disposing is at a first temperature at which the at least one phase change ink is in a molten, unseparated state (that is, is in a single phase); cooling the ink image to a second temperature sufficient to initiate crystallization of the at least one crystalline component of the phase change ink, wherein at the second temperature the at least one phase change ink comprises a crystalline phase and an amorphous phase; optionally, applying pressure to the ink image on the final image receiving substrate; and allowing the ink to complete crystallization.

The present process can be used for any suitable or desired printing application. In embodiment, the process is an ink jet printing process wherein one or more phase change inks are disposed directly onto a final image receiving substrate. In embodiments, the final image receiving substrate is paper. In an ink jet printing architecture, the ink impacts the paper at essentially the same temperature as the jetting temperature (wherein jetting temperature is typically from about 100° C. to about 140° C.). As the ink cools from the jetting temperature, certain types of ink can exhibit phase separation wherein one ink component rapidly crystallizes, while another ink component is in an amorphous state. The amorphous phase continues to penetrate into the paper coating and may carry much of the colorant with it. In this process, the upper layer of crystalline material can act as a less color intensive protective coating that increase resistance of the image to mechanical damage.

The print process herein enables (1) the "molten" state of a single phase ink or the "molten" state of two or more inks which become blended color inks in the jetting zone, and (2) the solid state of the ink or inks in the spreading zone. The molten and solid phases enable print robustness on coated media.

In embodiments, the phase change ink herein contains crystalline aromatic monoesters for direct to paper printing applications. The phase change ink herein can comprise at least one crystalline component of the formula

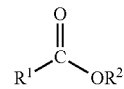

wherein $R^1$ and $R^2$ can be the same or different, and wherein $R^1$ and $R^2$ each, independently of the other is (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, about 1 to about 20 carbon atoms, or about 1 to about 10 carbon atoms, although the numbers can be outside of these ranges, (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, about 7 to about 20 carbon atoms, or about 7 to about 12 carbon atoms, although the numbers can be outside of these ranges, (iii) an alkylaryl group, which can be a substituted or unsubstituted alkylaryl group, wherein the alkyl portion of the alkylaryl group can be linear or branched, cyclic or acyclic, substituted or unsubstituted, saturated or unsaturated, and wherein heteroatoms may optionally be present in either the aryl or the alkyl portion of the alkylaryl group, in embodiments, having from about 4 to about 40 carbon atoms, about 7 to about 20 carbon atoms, or about 7 to about 12 carbon atoms, although the numbers can be outside of these ranges, or (iv) an aromatic group, which can be a substituted or unsubstituted aromatic group, wherein heteroatoms may optionally be present in the aromatic group, having from about 3 to about 40 carbon atoms, or about 6 to about 20 carbon atoms, or about 6 to about 10 carbon atoms, although the numbers can be outside of these ranges, provided that at least one of $R^1$ and $R^2$ is an aromatic group, and wherein the at least one crystalline component has a melting point of from about 65° C. to about 150° C.; at least one amorphous component; and an optional colorant.

The crystalline component selected for embodiments herein can be any suitable or desired crystalline component having the desired characteristics and which is miscible with the selected amorphous component. The crystalline component can have any suitable or desired melting temperature. In embodiments, the crystalline component herein has a melt temperature of from about 65 to about 150° C., from about 66 to about 145° C., or from about 67° C. to about 140° C. In a specific embodiment, the at least one crystalline component herein has a melting temperature less than about 150° C.

The crystalline component can have any suitable or desired crystallization temperature. In embodiments, the crystalline component has a crystallization temperature of from about 60 to about 140° C., from about 65 to about 125° C., or from about 66° C. to about 120° C., as determined by Differential Scanning calorimetry at a rate of 10° C./minute. In a specific embodiment, the at least one crystalline component herein has a crystallization temperature of greater than about 65° C. to less than about 140° C.

In certain embodiments, the phase change ink herein comprises a compound of the formula $$R^1\overset{\overset{\displaystyle O}{\|}}{C}OR^2$$

wherein at least one of $R^1$ and $R^2$ is of the formula

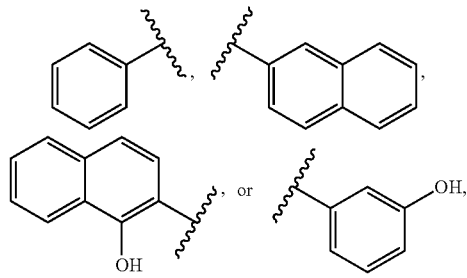

wherein 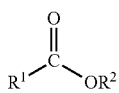 represents the point of attachment of the $R^1$ and $R^2$ group to the compound.

In certain embodiments, $R^1$ and $R^2$ are the same. In certain other embodiments, each of $R^1$ and $R^2$ is an aryl group.

In specific embodiments, the at least one crystalline component is a compound of the formula

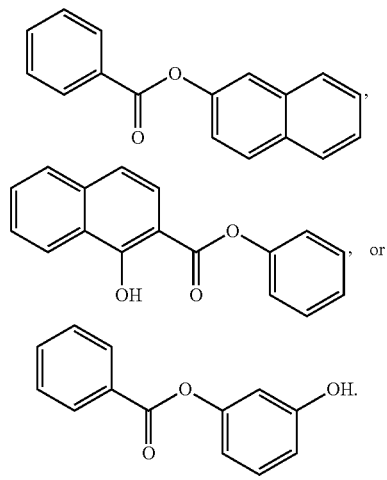

The crystalline component can be prepared by any suitable or desired method. For example, the crystalline component can be prepared by an esterification reaction between a compound having a hydroxyl group and a compound having a carboxylic acid group or an acid chloride group. Crystalline components are also commercially available, such as from TCI America.

Any suitable or desired amorphous compound can be used for the phase change ink herein, provided that it is compatible with the selected crystalline component. In embodiments, the amorphous component is a compound of the formula

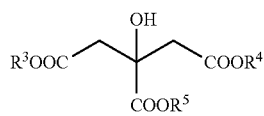

wherein $R^3$, $R^4$, and $R^5$ can be the same or different, and wherein $R^3$, $R^4$, and $R^5$ are each independently selected from (i) an alkyl group, which may be linear or branched, cyclic or acyclic, substituted or unsubstituted, saturated or unsaturated, and wherein heteroatoms either may or may not be present in the alkyl group, having from about 1 to about 40, about 1 to about 20, or about 1 to about 10 carbon atoms, although the number of carbon atoms can be outside of these ranges; (ii) an aryl group, which may be substituted or unsubstituted, and wherein heteroatoms either may or may not be present in the aryl group, having from about 3 to about 40, about 6 to about 20, or about 6 to about 10 carbon atoms, although the number of carbon atoms can be outside of these ranges; (iii) an arylalkyl group, which may be substituted or unsubstituted, wherein the alkyl portion of the arylalkyl group can be linear or branched, cyclic or acyclic, substituted or unsubstituted, saturated or unsaturated, and wherein heteroatoms either may or may not be present in either the aryl or the alkyl portion of the arylalkyl group, having from about 4 to about 40, about 7 to about 20, or about 7 to about 12 carbon atoms, although the number of carbon atoms can be outside of these ranges; or (iv) an alkylaryl group, which may be substituted or unsubstituted, wherein the alkyl portion of the alkylaryl group can be linear or branched, cyclic or acyclic, substituted or unsubstituted, saturated or unsaturated, and wherein heteroatoms either may or may not be present in either the aryl or the alkyl portion of the alkylaryl group, having from about 4 to about 40, about 7 to about 20, or about 7 to about 12 carbon atoms, although the number of carbon atoms can be outside of these ranges. In embodiments, $R^3$, $R^4$, and $R^5$ are the same.

In a specific embodiment, the amorphous component is a compound of the formula

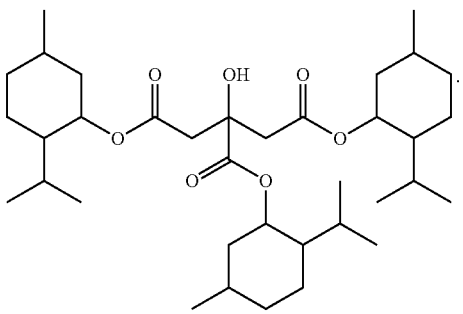 [SMILES: CC1CCC(C(C)C)C(OC(=O)CC(O)(CC(=O)OC2CC(C)CCC2C(C)C)C(=O)OC2CC(C)CCC2C(C)C)C1]

The amorphous component can be prepared by any suitable or desired method. For example, the amorphous component can be prepared as described in U.S. patent application Ser. No. 13/095,015, entitled "Solventless Reaction Process," which is hereby incorporated by reference herein in its entirety.

The crystalline component can be present in the phase change ink at any suitable or desired amount. In embodiments, the crystalline component is provided at from about 60 to about 95, or from about 65 to about 95, or from about 70 to about 90 weight percent, based upon the total combined weight of the crystalline and amorphous components.

The amorphous component can be present in the phase change ink at any suitable or desired amount. In embodiments, the amorphous component is provided at from about 5 to about 40, or from about 5 to about 35, or from about 10 to about 30 weight percent, based upon the total combined weight of the crystalline and amorphous components.

In embodiments, the ratio of crystalline component to amorphous component is from about 60:40 to about 95:5 percent by weight, based upon the total combined weight of the crystalline and amorphous components. In more specific embodiments, the weight ratio of the crystalline component to amorphous component is from about 65:35 to about 95:5, or from about 70:30 to about 90:10 percent by weight, based upon the total combined weight of the crystalline and amorphous components.

The phase change ink can be prepared by any suitable or desired method. For example, the components can be combined with stirring and heating to form the phase change ink. The phase change ink carrier materials may be combined in any suitable or desired order. For example, each of the components of the ink carrier can be mixed together, followed by heating the mixture to at least its melting point, for example from about 60° C. to about 150° C., about 80° C. to about 145° C., or about 85° C. to about 140° C., although not limited. The colorant may be added before the ink ingredients have been heated or after the ink ingredients have been heated. When pigments are the selected colorants, the molten mixture may be subjected to grinding in an attritor or ball mill apparatus or other high energy mixing equipment to affect dispersion of the pigment in the ink carrier. The heated mixture can then be stirred, such as for about 5 seconds to about 30 minutes or more, to obtain a substantially homogeneous, uniform melt, followed by cooling the ink to ambient temperature (typically from about 20° C. to about 25° C.). The inks are solid at ambient temperature.

The phase change inks can further contain a colorant compound. This optional colorant can be present in the ink in any desired or effective amount to obtain the desired color or hue, in embodiments from about 0.1 percent to about 50 percent by weight of the ink. Any desired or effective colorant can be employed, including dyes, pigments, mixtures thereof, and the like, provided that the colorant can be dissolved or dispersed in the ink vehicle. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon® Red 492 (BASF); Orasol® Red G (Pylam Products); Direct Brilliant Pink B (Oriental Giant Dyes); Direct Red 3BL (Classic Dyestuffs); Supranol® Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol® Brilliant Yellow 4GF (Clariant); Cibanone Yellow 2G (Classic Dyestuffs); Orasol® Black RLI (BASF); Orasol® Black CN (Pylam Products); Savinyl Black RLSN (Clariant); Pyrazol Black BG (Clariant); Morfast® Black 101 (Rohm & Haas); Diaazol Black RN (ICI); Thermoplast® Blue 670 (BASF); Orasol® Blue GN (Pylam Products); Savinyl Blue GLS (Clariant); Luxol® Fast Blue MBSN (Pylam Products); Sevron Blue 5GMF (Classic Dyestuffs); Basacid® Blue 750 (BASF); Keyplast Blue (Keystone Aniline Corporation); Neozapon® Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen® Blue FF-4012 (BASF); Fastol® Black BR (C.I. Solvent Black 35) (Chemische Fabriek Triade BV); Morton Morplas Magenta 36 (C.I. Solvent Red 172); metal phthalocyanine colorants, such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are hereby incorporated by reference herein in their entireties, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint® Orange X-38, uncut Reactint® Blue X-17, Solvent Yellow 162, Acid Red 52, Solvent Blue 44, and uncut Reactint® Violet X-80.

Pigments are also suitable colorants for the phase change inks. Examples of suitable pigments include PALIOGEN® Violet 5100 (BASF); PALIOGEN® Violet 5890 (BASF); HELIOGEN® Green L8730 (BASF); LITHOL® Scarlet D3700 (BASE); SUNFAST® Blue 15:4 (Sun Chemical); Hostaperm® Blue B2G-D (Clariant); Hostaperm® Blue B4G (Clariant); Permanent Red P-F7RK; Hostaperm® Violet BL (Clariant); LITHOL® Scarlet 4440 (BASF); Bon Red C (Dominion Color Company); ORACET® Pink RF (BASF); PALIOGEN® Red 3871 K (BASF); SUNFAST® Blue 15:3 (Sun Chemical); PALIOGEN® Red 3340 (BASF); SUNFAST® Carbazole Violet 23 (Sun Chemical); LITHOL® Fast Scarlet L4300 (BASF); SUNBRITE® Yellow 17 (Sun Chemical); HELIOGEN® Blue L6900, L7020 (BASF); SUNBRITE® Yellow 74 (Sun Chemical); SPECTRA® PAC C Orange 16 (Sun Chemical); HELIOGEN® Blue K6902, K6910 (BASF); SUNFAST® Magenta 122 (Sun Chemical); HELIOGEN® Blue D6840, D7080 (BASF); Sudan Blue OS (BASF); NEOPEN® Blue FF4012 (BASF); PV Fast Blue B2GO1 (Clariant); IRGALITE® Blue GLO (BASF); PALIOGEN® Blue 6470 (BASF); Sudan Orange G (Aldrich); Sudan Orange 220 (BASF); PALIOGEN® Orange 3040 (BASF); PALIOGEN® Yellow 152, 1560 (BASF); LITHOL® Fast Yellow 0991 K (BASF); PALIOTOL® Yellow 1840 (BASF); NOVOPERM® Yellow FGL (Clariant); Ink Jet Yellow 4G VP2532 (Clariant); Toner Yellow HG (Clariant); Lumogen® Yellow D0790 (BASF); Suco-Yellow L1250 (BASF); Suco-Yellow D1355 (BASF); Suco Fast Yellow D1355, D1351 (BASF); HOSTAPERM® Pink E 02 (Clariant); Hansa Brilliant Yellow 5GX03 (Clariant); Permanent Yellow GRL 02 (Clariant); Permanent Rubine L6B 05 (Clariant); FANAL® Pink D4830 (BASF); CINQUASIA® Magenta (DU PONT); PALIOGEN® Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Pigment dispersions in the ink base may be stabilized by synergists and dispersants. Generally, suitable pigments may be organic materials or inorganic. Magnetic material-based pigments are also suitable, for example, for the fabrication of robust Magnetic Ink Character Recognition (MICR) inks. Magnetic pigments include magnetic nanoparticles, such as for example, ferromagnetic nanoparticles.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are hereby totally incorporated by reference herein in their entireties.

The colorant may be present in the phase change ink in any desired or effective amount to obtain the desired color or hue such as, for example, from about 0.1 to about 50 percent by weight of the ink, about 0.2 to about 20 percent by weight of the ink, or about 0.5 to about 10 percent by weight of the ink.

The inks of the present disclosure can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, NAUGUARD® 445, and NAUGUARD® 512, commercially available from Uniroyal Chemical Company, Oxford, Conn., IRGANOX® 1010 (Ciba Geigy), N,N'-hexamethylene bis(3,5-di-tert-butyl-4-hydroxy hydrocinnamamide) (IRGANOX® 1098, BASF), 2,2-bis(4-(2-(3,5-di-tert-butyl-4-hydroxyhydrocinnamoyloxy)ethoxyphenyl)propane (TOPANOL-205®, available from Vertellus), tris(4-tert-butyl-3-hydroxy-2,6-dimethyl benzyl)isocyanurate (Aldrich), 2,2'-ethylidene bis(4,6-di-tert-butylphenyl)fluoro phosphonite (ETHANOX-398®, Albermarle Corporation), tetrakis (2,4-di-tert-butylphenyl)-4,4'-biphenyl diphosphonite (ALDRICH 46), pentaerythritol tetrastearate (TCI America), tributylammonium hypophosphite (Aldrich), 2,6-di-tert-butyl-4-methoxyphenol (Aldrich), 2,4-di-tert-butyl-6-(4-methoxybenzyl)phenol (Aldrich), 4-bromo-2,6-dimethylphenol (Aldrich), 4-bromo-3,5-didimethylphenol (Aldrich), 4-bromo-2-nitrophenol (Aldrich), 4-(diethyl aminomethyl)-2,5-dimethylphenol (Aldrich), 3-dimethylaminophenol (Aldrich), 2-amino-4-tert-amylphenol (Aldrich), 2,6-bis(hydroxymethyl)-p-cresol (Aldrich), 2,2'-methylenediphenol (Aldrich), 5-(diethylamino)-2-nitrosophenol (Aldrich), 2,6-dichloro-4-fluorophenol (Aldrich), 2,6-dibromo fluoro phenol (Aldrich), α-trifluoro-o-cresol (Aldrich), 2-bromo-4-fluorophenol (Aldrich), 4-fluorophenol (Aldrich), 4-chlorophenyl-2-chloro-1,1,2-tri-fluoroethyl sulfone (Aldrich), 3,4-difluoro phenylacetic acid (Adrich), 3-fluorophenylacetic acid (Aldrich), 3,5-difluoro phenylacetic acid (Aldrich), 2-fluorophenylacetic acid (Aldrich), 2,5-bis (trifluoromethyl)benzoic acid (Aldrich), ethyl-2-(4-(4-(trifluoromethyl)phenoxy)phenoxy)propionate (Aldrich), tetrakis (2,4-di-tert-butyl phenyl)-4,4'-biphenyl diphosphonite (Aldrich), 4-tert-amyl phenol (Aldrich), 3-(2H-benzotriazol-2-yl)-4-hydroxy phenethylalcohol (Aldrich), and the like, as well as mixtures thereof. When present, the optional antioxidant is present in the ink in any desired or effective amount, such as from about 0.01 percent to about 20 percent by weight of the ink.

The inks of the present disclosure can also optionally contain a viscosity modifier. Examples of suitable viscosity modifiers include aliphatic ketones, such as stearone, and the like. When present, the optional viscosity modifier is present in the ink in any desired or effective amount, such as from about 0.1 to about 99 percent by weight of the ink.

Other optional additives to the inks include defoamer, slip and leveling agents, clarifiers, tackifiers, adhesives, plasticizers, and the like, in any suitable or desired amount, such as from about 0.1 to about 50 percent by weight of the ink.

The ink compositions herein generally have melt viscosities of from about 1 centipoise to about 14 centipoise, or from about 2 centipoise to about 13 centipoise, or from about 3 centipoise to about 12 centipoise, although the melt viscosity can be outside of these ranges, at the jetting temperature, in embodiments, jetting temperature being from about 95° C. to about 150° C., about 100° C. to about 145° C., about 100° C. to about 140° C., or no higher than about 150° C., although the jetting temperature can be outside of these ranges. In embodiments, the phase change ink herein has a viscosity at jetting temperature of from about 1 centipoise to less than about 13 centipoise, wherein jetting temperature is from about 95° C. to about 140° C. In a specific embodiment, the phase change ink herein has a viscosity of less than about 13 centipoise at jetting temperature, wherein jetting temperature is from about 95° C. to about 140° C. In another specific embodiment, the phase change ink herein has a viscosity of about 0.5 to about 10 centipoise at a jetting temperature of about 140° C.

A process herein comprises disposing at least one phase change ink in an imagewise fashion onto a final image receiving substrate to form an ink image, wherein disposing is at a first temperature at which the at least one phase change ink is in a molten, unseparated state; wherein the at least one phase change ink comprises at least one crystalline component of the formula

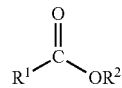

as described herein, wherein the at least one crystalline component has a melting point of from about 65° C. to about 150° C.; at least one amorphous component; and an optional colorant; cooling the ink image to a second temperature sufficient to initiate crystallization of at least one crystalline component; optionally, applying pressure to the ink image on the final image receiving substrate; and allowing the ink to complete crystallization. In embodiments, disposing the phase change ink at a first temperature comprises disposing at a temperature of from about 95° C. to about 150° C.

In further embodiments, a process herein comprises (1) incorporating into an ink jet printing apparatus at least one phase change ink; wherein the at least one phase change ink comprises at least one crystalline component of the formula

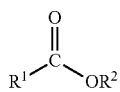

as described herein, wherein the at least one crystalline component has a melting point of from about 65° C. to about 150° C.; at least one amorphous component; and an optional colorant; (2) heating the at least one phase change ink to a first temperature at which the at least one phase change ink is in a molten, unseparated state; (3) causing droplets of the at least one phase change ink to be ejected in an imagewise pattern onto a final image receiving substrate; (4) cooling the ink image to a second temperature sufficient to initiate crystallization of the at least one crystalline component, wherein the at least one phase change ink comprises a crystalline phase and an amorphous phase; (5) optionally, applying pressure to the ink image on the final image receiving substrate; and (6) allowing the ink to complete crystallization.

The phase change inks herein can be employed in apparatus for direct printing ink jet processes and in indirect (offset) printing ink jet applications One embodiment of the present disclosure is directed to a process which comprises incorporating a phase separation ink into an ink jet printing apparatus, melting the ink, and causing droplets of the melted ink to be ejected in an imagewise pattern onto a recording substrate. A direct printing process is disclosed in, for example, U.S. Pat. No. 5,195,430, the disclosure of which is totally incorporated herein by reference. In embodiments, the substrate is a final recording sheet and droplets of the melted ink are ejected in an imagewise pattern directly onto the final recording sheet.

Yet another embodiment of the present disclosure is directed to a process which comprises incorporating a phase separation ink into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference.

In one specific embodiment, the printing apparatus employs a piezoelectric printing process wherein droplets of the ink are caused to be ejected in imagewise pattern by oscillations of piezoelectric vibrating elements. In embodiments, the intermediate transfer member is heated to a temperature above that of the final recording sheet and below that of the melted ink in the printing apparatus.

Inks of the present disclosure can also be employed in other hot melt printing processes, such as hot melt acoustic ink jet printing, hot melt thermal ink jet printing, hot melt continuous stream or deflection ink jet printing, and the like. Phase change inks of the present disclosure can also be used in printing processes other than hot melt ink jet printing processes.

Any suitable substrate or recording sheet can be employed, including plain papers such as XEROX® 4200 papers, XEROX® Image Series papers, Courtland 4024 DP paper, ruled notebook paper, bond paper, coated paper, silica coated papers such as Sharp Company silica coated paper, JuJo paper, Hammermill® Laserprint Paper, and the like, glossy coated papers, such as XEROX® Digital Color Elite Gloss, Sappi Warren Papers LUSTROGLOSS®, specialty papers such as Xerox® DURAPAPER®, and the like, calcium carbonate coated paper, clay coated paper, kaolin clay coated paper, and the like, transparency materials, fabrics, textile products, plastics, polymeric films, inorganic substrates such as metals and wood, and the like. In a specific embodiment, the final image receiving substrate is coated paper. In another specific embodiment, the final image receiving substrate is clay coated paper.

In embodiments, the process herein comprises a process wherein the final image receiving substrate comprises a base layer, a top coat layer disposed over a first surface of the base layer; and, optionally, a bottom coat layer disposed over a second, opposite surface of the base layer; wherein the ink image is disposed on the top coat layer; wherein the amorphous phase of the at least one phase change ink substantially penetrates into the top coat layer of the final image receiving substrate; and wherein the crystalline phase of the at least one phase change ink substantially remains on the surface of the top coat layer of the final image receiving substrate.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

0.6 gram of trimenthyl citrate, of the formula

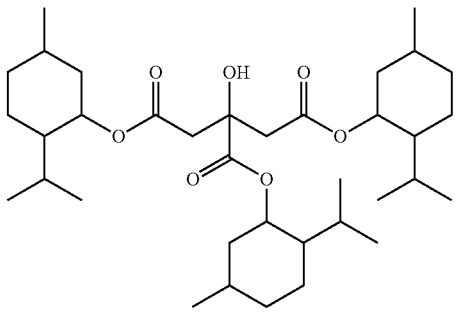 [SMILES: CC1CCC(C(C)C)C(OC(=O)CC(O)(CC(=O)OC2CC(C)CCC2C(C)C)C(=O)OC2CC(C)CCC2C(C)C)C1]

prepared as described in U.S. patent application Ser. No. 13/095,795, which is hereby incorporated by reference herein in its entirety, having a complex viscosity, η, wherein (η(>100° C.)<10² cps and η (at room temperature) >10⁶ cps) and 1.4 grams of 2-naphthyl benzoate of the formula

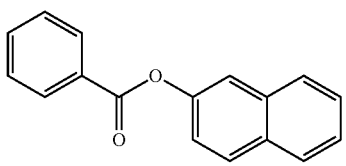 [SMILES: O=C(Oc1ccc2ccccc2c1)c1ccccc1]

(commercially available from TCI America), were combined with stirring in the molten state at 120° C., and then cooled down to room temperature (about 24° C.) to obtain the ink samples. The crystalline/amorphous ratio of the ink samples was 70/30 in weight percent. The crystalline and amorphous materials were well miscible in this mixing ratio.

Differential scanning calorimetry (DSC) was employed to measure thermal properties of 2-naphthyl benzoate. FIG. 1 shows DSC data for a first heating and cooling cycle of 2-naphthyl benzoate.

Figure 2:
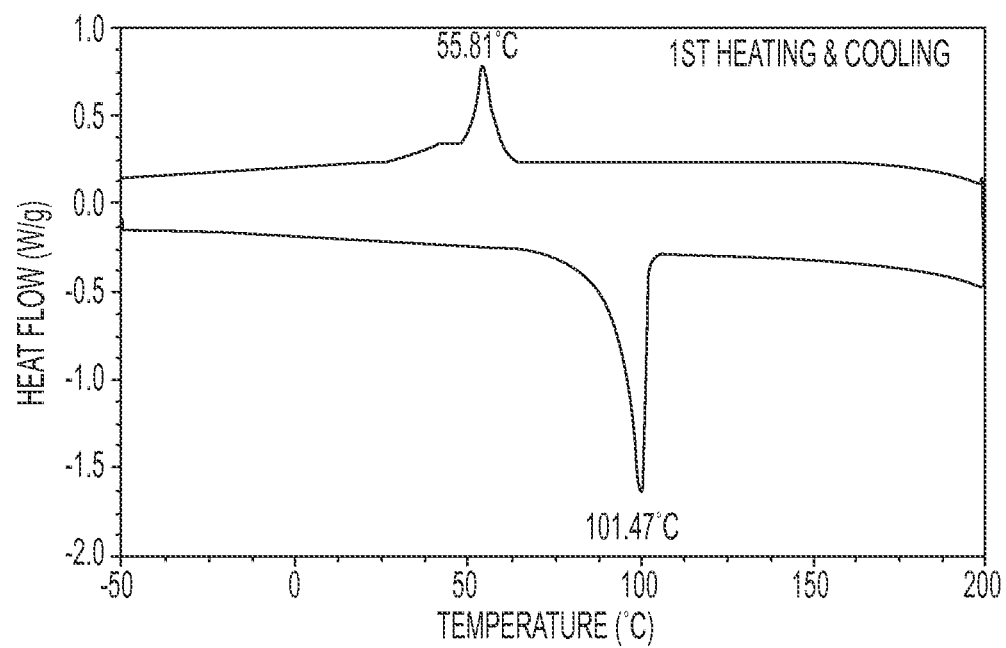
FIG. 2 is a graph illustrating heat flow (W/g, y-axis) versus temperature (° C., x-axis) for a first heating and cooling of an ink prepared in accordance with the present disclosure.

Differential scanning calorimetry (DSC) was employed to measure thermal properties of a sample of the ink of Example 1. FIG. 2 shows DSC data for a first heating and cooling cycle of a sample of the ink of Example 1. The DSC data was obtained on a Q1000® Differential Scanning calorimeter (TA Instruments) at a rate of 10° C./minute from −50 to 150 to −50° C.

Figure 3:
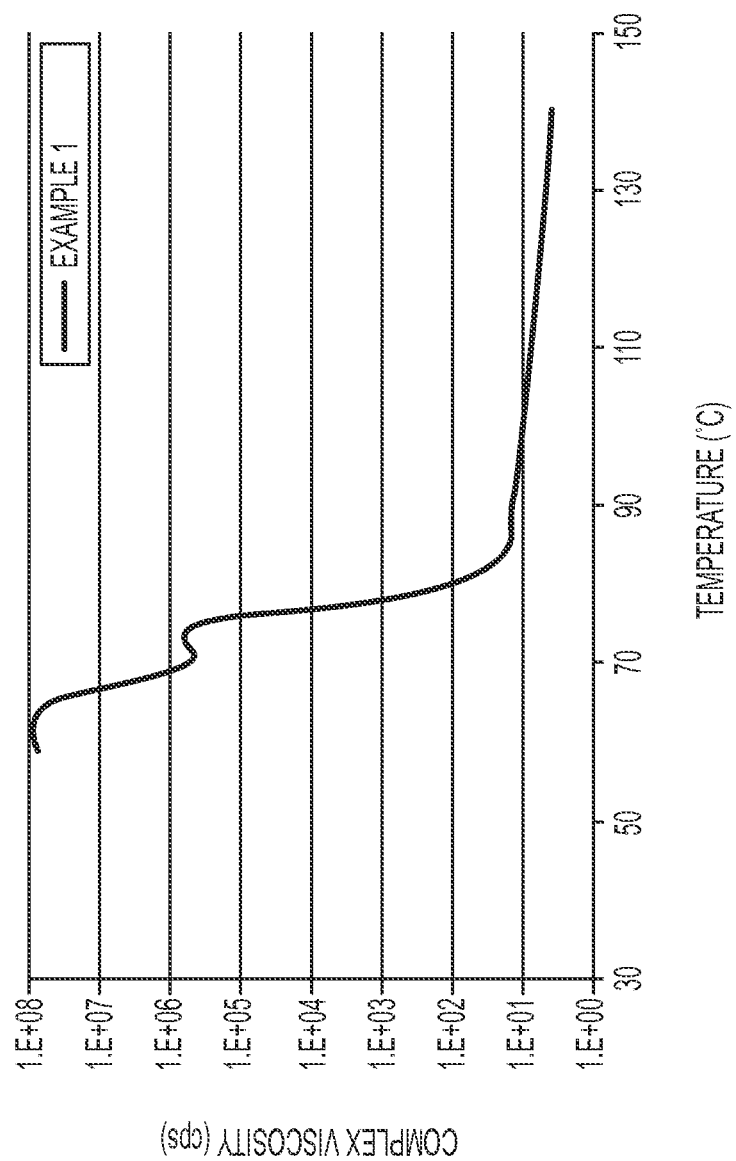
FIG. 3 is a graph illustrating complex viscosity (centipoises (cps), y-axis) versus temperature (° C., x-axis) for an ink prepared in accordance with the present disclosure.

Rheology data of a sample of the ink of Example 1 was obtained by testing with a controlled-strain rheometer from TA Instruments (Rheometrics RFS-3) using a 25 millimeter parallel plate. A temperature sweep from 140° C. to 60° C. at a frequency of 1 Hz was conducted with measurements every five degrees, a soak (equilibration) time of 120 seconds between each temperature, and at a constant frequency of 1 Hz. FIG. 3 illustrates complex viscosity (y-axis, centipoises (cps)) versus temperature (x-axis, ° C.) for the ink of Example 1.

Example 2

Print Performance of Ink Samples Containing Colorant

To 3.88 grams of an ink sample having the same formulation as Example 1, above, was further added 3 weight percent (0.12 grams) of cyan dye (Orasol® Blue GN, Ciba), with mixing with a magnetic stirrer at about 130° C. for about 30 minutes, which showed good solubility in the ink. The ink was printed using a K Printing Proofer (manufactured by RK Print Coat Instrument Ltd., Litlington, Royston, Heris, SG8 0OZ, U.K.) onto Xerox® Digital Color Elite Gloss, 120 gsm (DCEG). When a scratch/gouge finger with a curved tip at an angle of about 15° from vertical, with a weight of 528 grams applied, was drawn across the image at a rate of approximately 13 millimeters/second, no ink was visibly removed from the image. The scratch/gouge tip is similar to a lathe round nose cutting bit with a radius of curvature of approximately 12 millimeters.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A phase change ink comprising:
at least one crystalline component of the formula

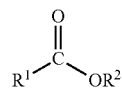

wherein $R^1$ and $R^2$ can be the same or different, and wherein $R^1$ and $R^2$ each, independently of the other is (i) an alkyl group, which can be a linear or branched, cyclic or acyclic, substituted or unsubstituted, saturated or unsaturated alkyl group, and wherein heteroatoms may optionally be present in the alkyl group, (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, (iii) an alkylaryl group, which can be a substituted or unsubstituted alkylaryl group, wherein the alkyl portion of the alkylaryl group can be linear or branched, cyclic or acyclic, substituted or unsubstituted, saturated or unsaturated, and wherein heteroatoms may optionally be present in either the aryl or the alkyl portion of the alkylaryl group, or (iv) an aromatic group, which can be a substituted or unsubstituted aromatic group, and wherein heteroatoms may optionally be present in the aromatic group, provided that at least one of $R^1$ and $R^2$ is an aromatic group, and wherein the at least one crystalline component has a melting point of from about 65° C. to about 150° C.;
at least one amorphous component; and
an optional colorant.

2. The phase change ink of claim 1, wherein the at least one crystalline component has a crystallization temperature of greater than about 65° C. to less than about 140° C.

3. The phase change ink of claim 1, wherein the phase change ink has a viscosity of about 0.5 to about 10 centipoise at a jetting temperature of about 140° C.

4. The phase change ink of claim 1, wherein at least one of $R^1$ and $R^2$ is of the formula

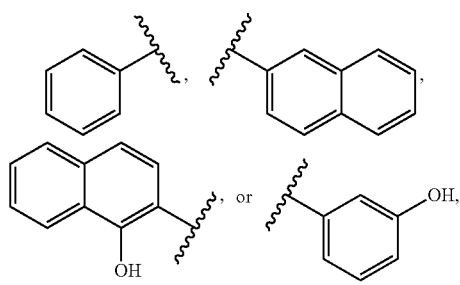

wherein ∿ represents the point of attachment of the $R^1$ and $R^2$ group to the compound.

5. The phase change ink of claim 1, wherein each of $R^1$ and $R^2$ is an aryl group.

6. The phase change ink of claim 1, wherein the at least one crystalline component is a compound of the formula

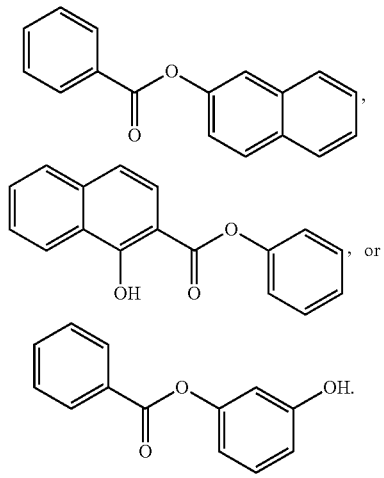

7. The phase change ink of claim 1, wherein the ratio of crystalline component to amorphous component is from about 60:40 to about 95:5 percent by weight, based upon the total combined weight of the crystalline and amorphous components.

8. The phase change ink of claim 1, wherein the amorphous component is a compound of the formula

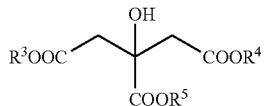

wherein $R^3$, $R^4$, and $R^5$ can be the same or different, and wherein $R^3$, $R^4$, and $R^5$ each, independently of the other, is (i) an alkyl group, which may be linear or branched, cyclic or acyclic, substituted or unsubstituted, saturated or unsaturated, and wherein heteroatoms either may or may not be present in the alkyl group; (ii) an aryl group, which may be substituted or unsubstituted, and wherein heteroatoms either may or may not be present in the aryl group; (iii) an arylalkyl group, which may be substituted or unsubstituted, wherein the alkyl portion of the arylalkyl group can be linear or branched, cyclic or acyclic, substituted or unsubstituted, saturated or unsaturated, and wherein heteroatoms either may or may not be present in either the aryl or the alkyl portion of the arylalkyl group; or (iv) an alkylaryl group, which may be substituted or unsubstituted, wherein the alkyl portion of the alkylaryl group can be linear or branched, cyclic or acyclic, substituted or unsubstituted, saturated or unsaturated, and wherein heteroatoms either may or may not be present in either the aryl or the alkyl portion of the alkylaryl group.

9. The phase change ink of claim 8, wherein $R^3$, $R^4$, and $R^5$ are the same.

10. The phase change ink of claim 8, wherein the amorphous component is a compound of the formula

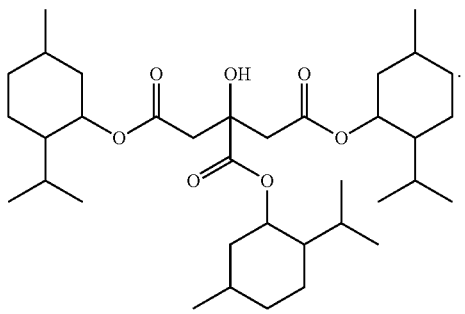 [SMILES: CC1CCC(C(C)C)C(OC(=O)CC(O)(CC(=O)OC2CC(C)CCC2C(C)C)C(=O)OC2CC(C)CCC2C(C)C)C1]

* * * * *